(12) United States Patent
Kulkarni

(10) Patent No.: US 12,103,467 B2
(45) Date of Patent: Oct. 1, 2024

(54) UPLIFT TWINE BOX DOOR LINKAGE SYSTEM FOR BALER IMPLEMENT

(71) Applicant: DEERE & COMPANY, Moline, IL (US)

(72) Inventor: Nikhil Kulkarni, Pune (IN)

(73) Assignee: DEERE & COMPANY, Moline, IL (US)

( * ) Notice: Subject to any disclaimer, the term of this patent is extended or adjusted under 35 U.S.C. 154(b) by 379 days.

(21) Appl. No.: 17/644,359

(22) Filed: Dec. 15, 2021

(65) Prior Publication Data

US 2023/0182656 A1 Jun. 15, 2023

(51) Int. Cl.
| | |
|---|---|
| B60R 11/06 | (2006.01) |
| A01F 15/12 | (2006.01) |
| A01F 15/14 | (2006.01) |
| B60R 11/00 | (2006.01) |

(52) U.S. Cl.
CPC ............... B60R 11/06 (2013.01); *A01F 15/14* (2013.01); *B60R 2011/004* (2013.01)

(58) Field of Classification Search
CPC .......... A01F 15/14; A01F 15/12; B60R 11/06; B60R 2011/004
See application file for complete search history.

(56) References Cited

U.S. PATENT DOCUMENTS

| | | | |
|---|---|---|---|
| 8,162,190 B2 * | 4/2012 | Hanson | B60R 9/00 224/404 |
| 2004/0177773 A1 * | 9/2004 | McClure | A01F 15/12 100/88 |
| 2007/0266865 A1 * | 11/2007 | Kendrick | A01F 15/14 100/34 |
| 2019/0111854 A1 * | 4/2019 | Abel-Bey | E05F 15/73 |
| 2020/0122636 A1 * | 4/2020 | Oh | B60R 11/06 |
| 2021/0364224 A1 * | 11/2021 | Oh | F25D 23/028 |

* cited by examiner

*Primary Examiner* — Mohammed S. Alawadi (57) ABSTRACT

A baler implement includes a twine storage box, and a door panel positioned in a substantially vertical orientation relative to the twine storage box. The door panel is moveably attached to the housing for movement between a lowered position enclosing the twine storage box, and a raised position providing external access to the twine storage box. A linkage system interconnects the housing and the door panel. The linkage system includes a first link and a second link, each interconnecting the door panel and the housing. The first link and the second link are configured to maintain the door panel in the substantially vertical orientation relative to the housing while moving between the lowered position and the raised position.

28 Claims, 8 Drawing Sheets

UPLIFT TWINE BOX DOOR LINKAGE SYSTEM FOR BALER IMPLEMENT

TECHNICAL FIELD

The disclosure generally relates to a baler implement, and more specifically, to a linkage system for attaching a door panel to a housing of a baler implement to enclose a twine storage box of the baler implement.

BACKGROUND

A baler implement collects and forms crop material into a bale. One non-limiting implementation of the baler implement includes a large square baler which forms the bale to include a parallelepiped shape. Once the bale is formed, the baler implement secures the shape of the bale with a wrap material. The wrap material may include, but is not limited to, a twine or other similarly stranded binding material. The twine may be stored in a twine storage box of the baler implement. The twine storage box may be formed and/or defined by multiple panels of a housing of the baler implement. The twine storage box includes an open exterior side, providing access to the twine storage box from an exterior of the baler implement. A door panel may be attached to the housing of the baler implement, adjacent the open exterior side of the twine storage box, to enclose the twine storage box and limit dust and debris intrusion into the twine storage box during operation of the baler implement. In order to access the twine storage box, the door panel may be moveably attached to the housing, for movement between a lowered position enclosing the twine storage box, and a raised position providing access to the twine storage box from the exterior of the baler implement.

SUMMARY

A baler implement is provided. The baler implement includes a housing defining a twine storage box. A door panel is positioned in a substantially vertical orientation relative to the housing. The door panel is moveably attached to the housing for movement between a lowered position and a raised position. When the door panel is disposed in the lowered position, the door panel encloses the twine storage box. When the door panel is disposed in the raised position, the door panel provides external access to the twine storage box. A linkage system interconnects the housing and the door panel. The linkage system includes a first link and a second link. Each of the first link and the second link interconnect the door panel and the housing. The first link and the second link are configured to maintain the door panel in the substantially vertical orientation relative to the housing while moving between the lowered position and the raised position.

In one aspect of the disclosure, the twine storage box includes a lower horizontal wall and an upper horizontal wall. The upper horizontal wall is positioned vertically above and spaced from the lower horizontal wall. The door panel includes a lower edge and an upper edge, with the upper edge of the door panel positioned vertically above and spaced from the lower edge of the door panel. When the door panel is disposed in the lowered position, the lower edge of the door panel is positioned proximate the lower horizontal wall of the twine storage box. When the door panel is disposed in the raised position, the lower edge of the door panel is positioned proximate the upper horizontal wall of the twine storage box.

In one aspect of the disclosure, the first link and the second link are configured to move the door panel relative to the housing in both a transverse direction and a vertical direction, simultaneously, while maintaining the substantially vertical orientation of the door panel relative to the housing.

In one implementation of the baler implement, the linkage system may include a position controller. The position controller interconnects the housing and one of the first link and the second link. In one implementation, the position controller interconnects the housing and the first link. However, in other implementations, the position controller may interconnect the housing and the second link. The position controller is operable to secure the door panel relative to the housing in both the raised position and the lowered position.

In one implementation of the linkage system, the position controller is operable to extend and retract along a linear path, and is biased toward extension. For example, in one implementation, the position controller includes a gas spring having a first end coupled to the housing, and a second end coupled to one of the first link or the second link.

In one implementation, the position controller is coupled to the one of the first link and the second link in a position to move over-center, relative to an axis of rotation of the one of the first link and the second link, during movement of the door panel between the raised position and the lowered position. The position controller may move over-center such that the position controller biases the one of the first link and the second link about the axis of rotation in a first rotational direction when the door panel is disposed in the raised position, and biases the one of the first link and the second link about the axis of rotation in a second rotational direction when the door panel is disposed in the lowered position. For example, in one implementation, the position controller is coupled to the first link at a position that enables the position controller to move over-center of an axis of rotation of the first link relative to the housing. As such, the position controller biases the first link in the first rotational direction about the axis of rotation of the first link when the door panel is disposed in the raised position to bias the door panel into the raised position. As the position controller moves over-center of the axis of rotation of the first link, the position controller biases the first link in the second rotational direction about the axis of rotation of the first link when the door panel is disposed in the lowered position to bias the door panel into the lowered position.

In one implementation of the disclosure, the first link may include an approximate L-shape having a first leg portion and a second leg portion. Each of the first leg portion and the second leg portion of the first link extend away from a first link vertex.

The first leg portion of the first link extends from the first link vertex a first distance to a first leg attachment location. The first link is rotatably coupled to the housing at the first leg attachment location. The second leg portion of the first link extends from the first link vertex a second distance to a second leg attachment location. The first link is rotatably coupled to the door panel at the second leg attachment location. The first leg attachment location is positioned vertically above the second leg attachment location. In one implementation of the linkage system, the second distance is greater than the first distance.

As described above, the first link includes the approximate L-shape. In one aspect of the disclosure, the first leg portion of the first link and the second leg portion of the first link define a first link angle therebetween, thereby defining the approximate L-shape of the first link. In one implementation, the first link angle is substantially equal to ninety degrees. In another implementation, the first link angle may vary from the example implementation of substantially equal to ninety degrees. For example, the first link angle may include a value between the range of sixty degrees and one hundred twenty degrees.

In one implementation of the disclosure, the second link may include an approximate L-shape having a first leg portion and a second leg portion. Each of the first leg portion and the second leg portion of the second link extend away from a second link vertex.

The first leg portion of the second link extends from the second link vertex a third distance to a third leg attachment location. The second link is rotatably coupled to the housing at the third leg attachment location. The second leg portion of the second link extends from the second link vertex a fourth distance to a fourth leg attachment location. The second link is rotatably coupled to the door panel at the fourth leg attachment location. In one implementation of the linkage system, the fourth distance is greater than the third distance. The third leg attachment location is positioned vertically between the first leg attachment location and the second leg attachment location. The second leg attachment location is positioned vertically between the third leg attachment location and the fourth leg attachment location. The fourth leg attachment location is positioned vertically below the second leg attachment location. The third leg attachment location is positioned vertically above the fourth leg attachment location.

As described above, the second link includes the approximate L-shape. In one aspect of the disclosure, the first leg portion of the second link and the second leg portion of the second link define a second link angle therebetween, thereby defining the approximate L-shape of the second link. In one implementation, the second link angle is substantially equal to ninety degrees. In another implementation, the second link angle may vary from the example implementation of substantially equal to ninety degrees. For example, the second link angle may include a value between the range of seventy degrees and one hundred ten degrees.

In one aspect of the disclosure, the linkage system includes a connection link. The connection link includes an upper end and a lower end. The upper end of the connection link is rotatably coupled to the first link proximate the first link vertex. The lower end of the connection link is rotatably coupled to the second link proximate the second link vertex.

In one implementation of the disclosure, the linkage system may include a housing bracket. The housing bracket interconnects the housing and the first link, and interconnects the housing and the second link. As such, the housing bracket may be formed and/or include a shape configured for attaching the first link and the second link to the housing. In one implementation, the housing bracket may further interconnect the housing and the position controller.

In one implementation of the disclosure, the linkage system may include a panel bracket. The panel bracket interconnects the door panel and the first link, and interconnects the door panel and the second link. As such, the panel bracket may be formed and/or include a shape configured for attaching the first link and the second ling to the door panel.

The baler implement and linkage system described above is configured to move the door panel vertically upward, while maintaining its generally vertical orientation relative to the housing. By moving in this fashion, instead of rotating or swinging the door panel relative to the housing, access to the twine storage box is improved. Additionally, the raised position of the door panel reduces the opportunity of having dirt and debris fall onto an operator.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
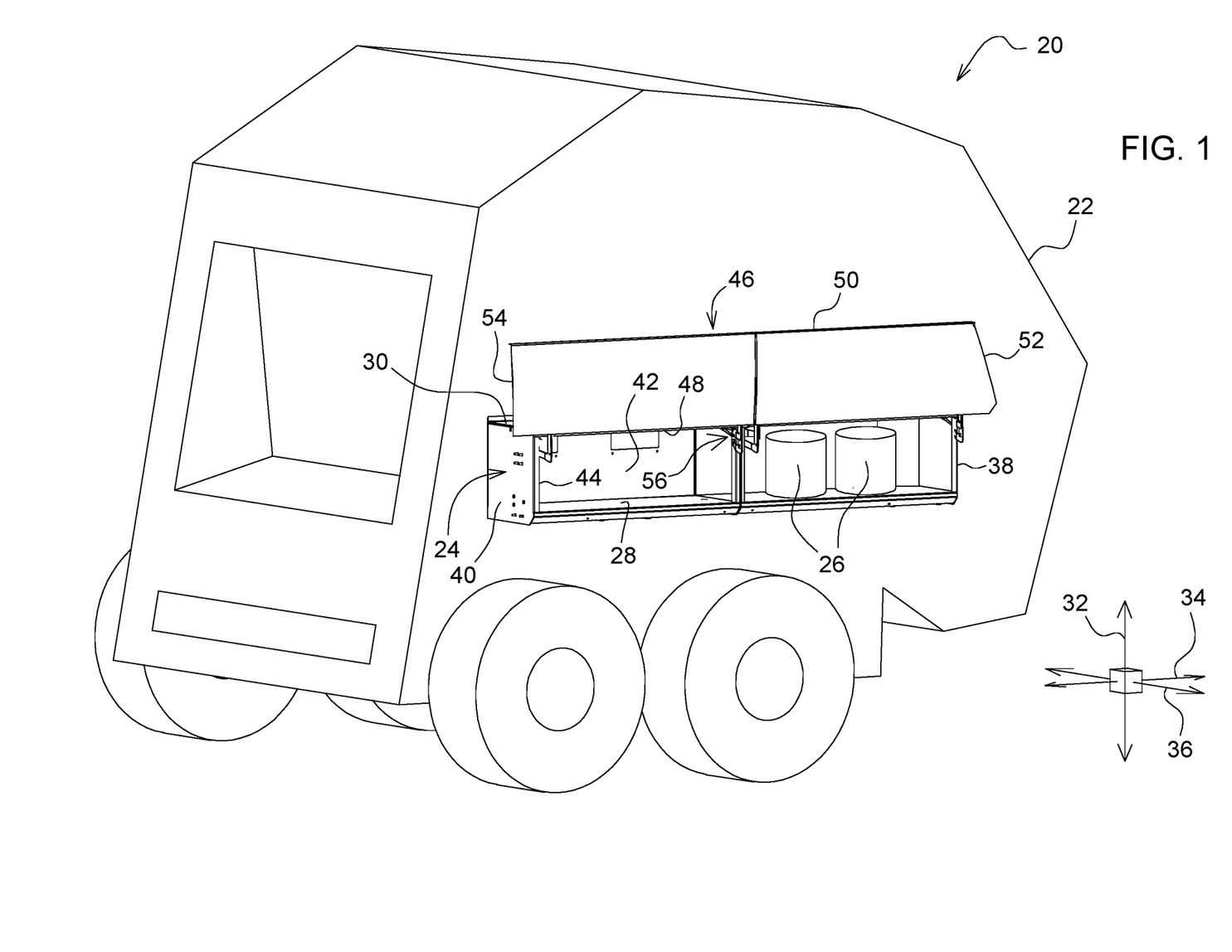
FIG. 1 is a schematic perspective view of a baler implement.

Referring to the Figures, wherein like numerals indicate like parts throughout the several views, a baler implement 20 is generally shown at 20 in FIG. 1. The example implementation of the baler implement 20 shown in the Figures and described herein is embodied as a large square baler. However, it should be appreciated that the baler implement 20 may be configured differently than the example implementation described herein.

The baler implement 20 is configured to gather and form crop material into a bale. In the example implementation shown in the Figures and described herein, the bale includes a parallelepiped shape. However, it should be appreciated that the baler implement 20 may be configured to form the bale into some other shape. The baler implement 20 may further include a knotter system for binding the bale with a twine. Once formed into a bale, the knotter system may be engaged to bind the bale with the twine. The specific features, components, and operation of the baler implement 20 related to gathering and forming the crop material into the bale and binding the bale with the twine, other than described in greater detail below, are not pertinent to the teachings of this disclosure, are known to those skilled in the art, and therefore are not described in detail herein.

Referring to FIG. 1, the baler implement 20 includes a housing 22. The housing 22 may be formed into a shape that defines a twine storage box 24. One or more twine balls 26 may be stored in the twine storage box 24 as is understood by those skilled in the art. The twine storage box 24 may be formed from one or more panels, brackets, etc. of the housing 22. As such, it should be appreciated that the housing 22 should be interpreted broadly to include multiple panels, components, features, etc., that form both internal and external features of the baler implement 20.

Figure 2:
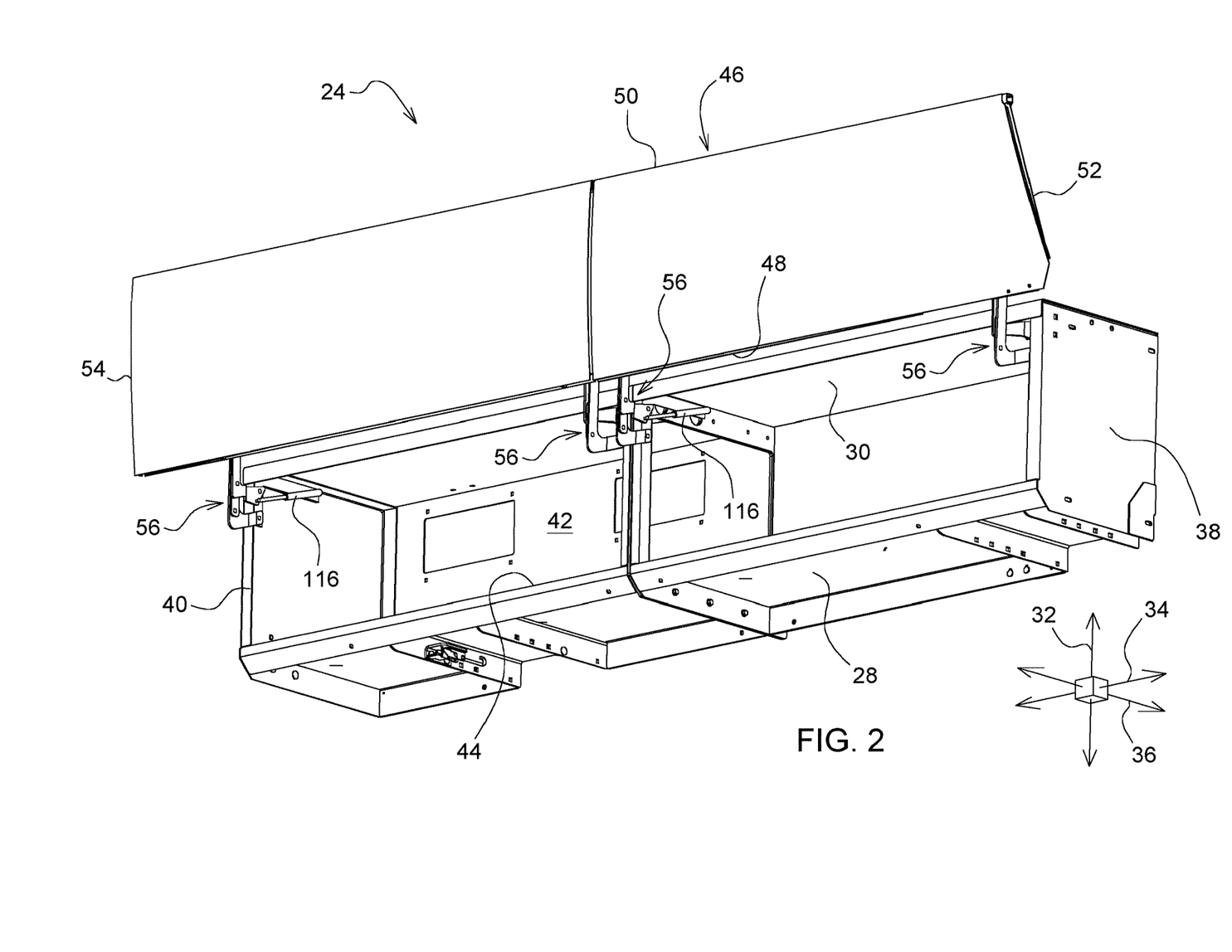
FIG. 2 is a schematic perspective view of a twine storage box of the baler implement.

Referring to FIG. 2, the twine storage box 24 includes a lower horizontal wall 28 forming a bottom surface of the twine storage box 24, and an upper horizontal wall 30 forming a top surface of the twine storage box 24. The upper horizontal wall 30 is positioned vertically above and spaced apart from the lower horizontal wall 28 along a vertical axis 32. Additionally, the upper horizontal wall 30 is generally parallel with the lower horizontal wall 28. Each of the upper horizontal wall 30 and the lower horizontal wall 28 may include a generally planar structure arranged in a horizontal orientation parallel with a ground surface. The upper horizontal wall 30 and the lower horizontal wall 28 each extend along a longitudinal axis 34 between a respective forward end and a rearward end.

As used herein, the longitudinal axis 34 extends parallel to a central longitudinal axis 34 of the bale implement and a direction of travel of the baler implement 20 during operation. The longitudinal axis 34 is arranged generally perpendicular to a direction of gravity, i.e., approximately parallel with the ground surface. The vertical axis 32 is orthogonal to the longitudinal axis 34 and extends vertically upward in a direction parallel with the direction of gravity. A transverse axis 36 is orthogonal to both the longitudinal axis 34 and the vertical axis 32. The transverse axis 36 extends across a width of the baler implement 20. The transverse axis 36 is arranged generally perpendicular to the direction of gravity, i.e., approximately parallel with the ground surface.

The twine storage box 24 may further include a forward end wall 38 forming a forward side surface of the twine storage box 24, and a rearward end wall 40 forming a rearward side surface of the twine storage box 24. The forward end wall 38 is spaced axially apart from the rearward end wall 40 along the longitudinal axis 34. The forward end wall 38 is generally parallel with the rearward end wall 40. Each of the forward end wall 38 and the rearward end wall 40 may include generally a planar structure arranged in a generally vertical orientation extending perpendicular to the ground surface. The forward end wall 38 and the rearward end wall 40 are positioned at axial ends of the upper horizontal wall 30 and the lower horizontal wall 28 relative to the longitudinal axis 34.

The twine storage box 24 may further include an interior wall 42. The interior wall 42 extends vertically along the vertical axis 32 between the lower horizontal wall 28 and the upper horizontal wall 30, and horizontally along the longitudinal axis 34 between the forward end wall 38 and the rearward end wall 40. The interior wall 42 is positioned toward an interior of the baler implement 20. The twine storage box 24 may further include an opening 44 disposed opposite the interior wall 42, adjacent an exterior side of the twine storage box 24. A region bounded by the twine storage box 24 may be accessed from an exterior of the baler implement 20 through the opening 44. Accordingly, as understood by those skilled in the art, the twine balls 26 may be stored and accessed through the opening 44 of the twine storage box 24.

Figure 3:
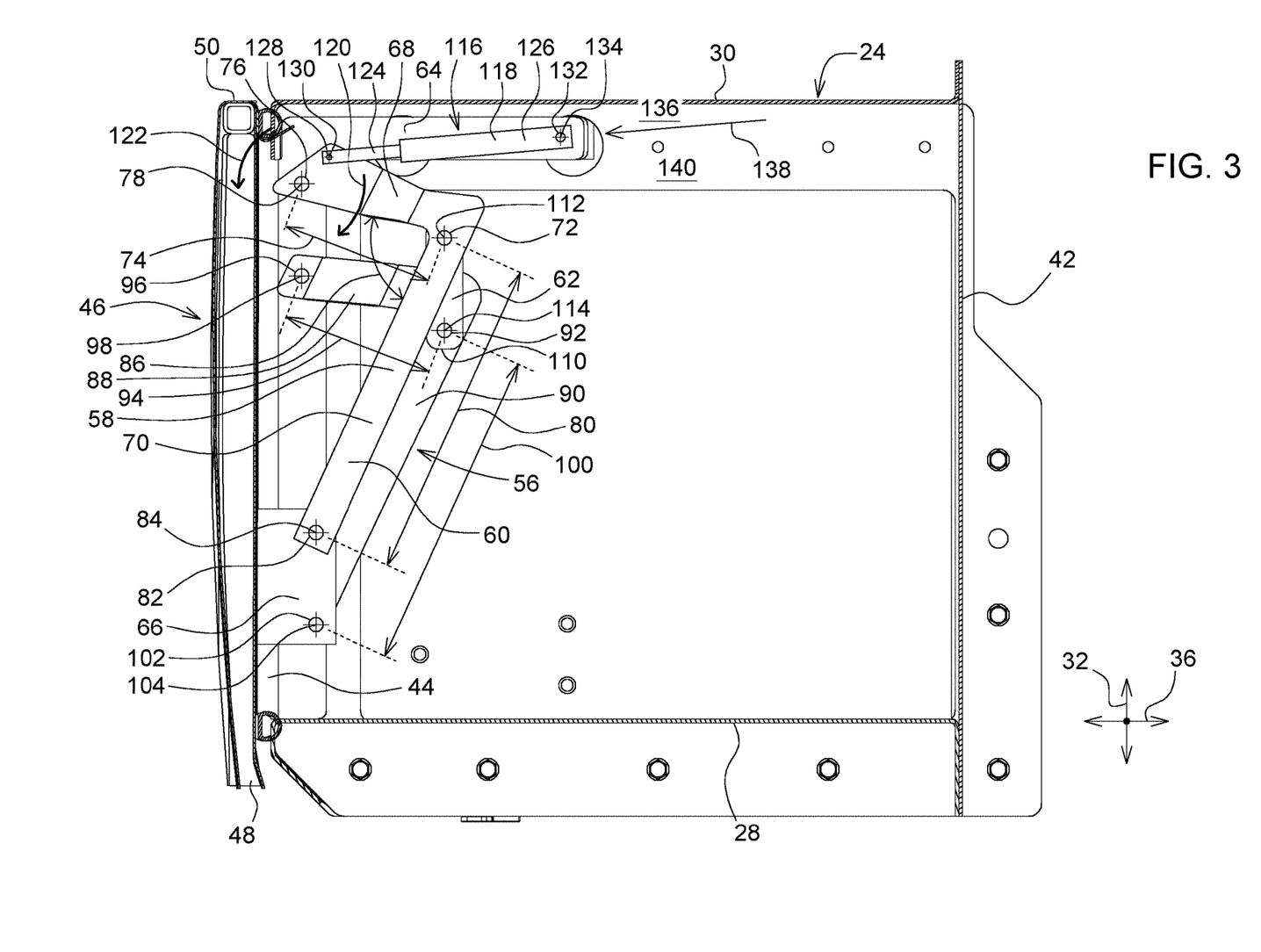
FIG. 3 is a schematic cross sectional side view of the twine storage box showing a door panel in a lowered position.
Figure 4:
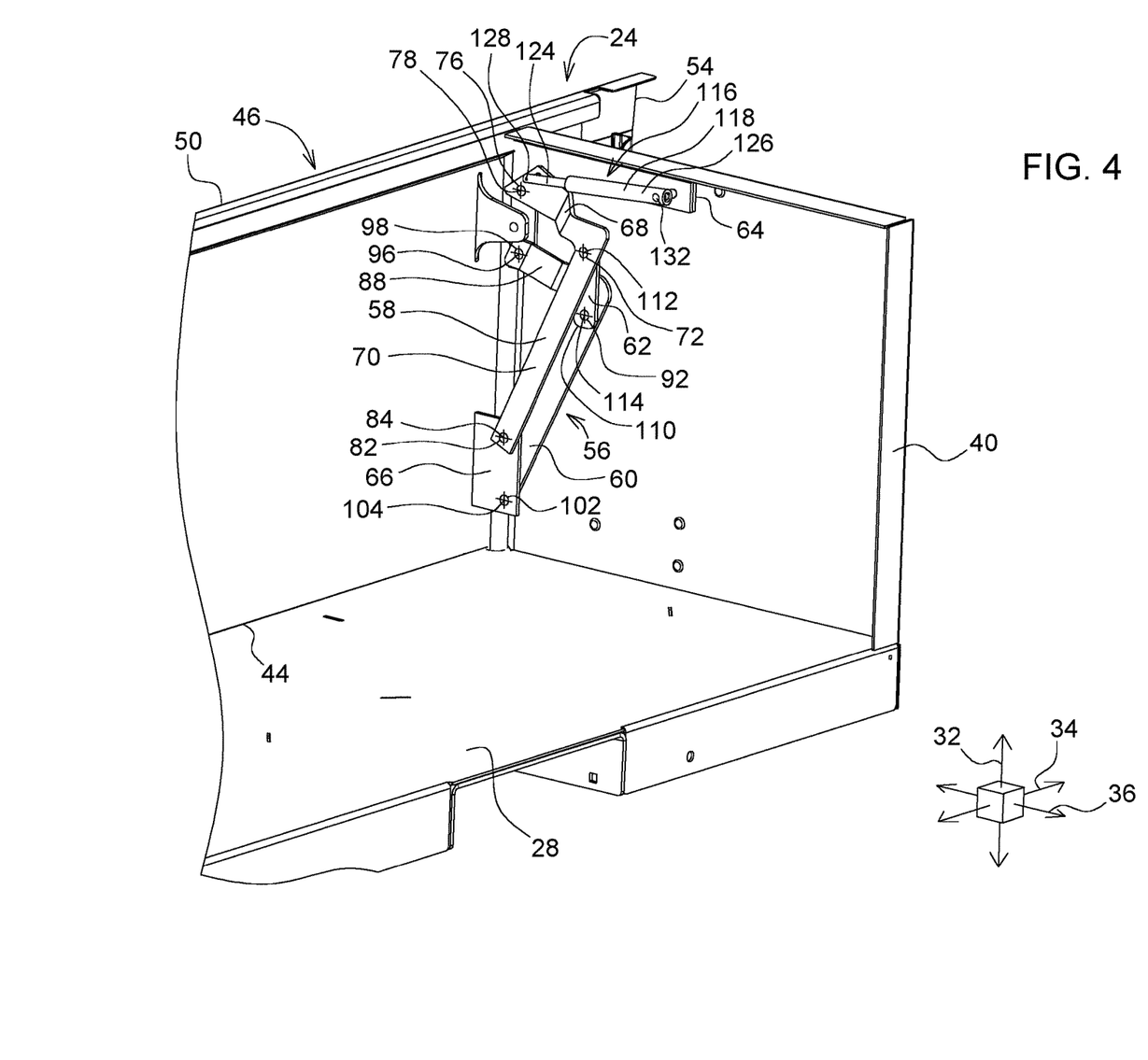
FIG. 4 is a schematic perspective view of the twine storage box showing the door panel in the lowered position.
Figure 5:
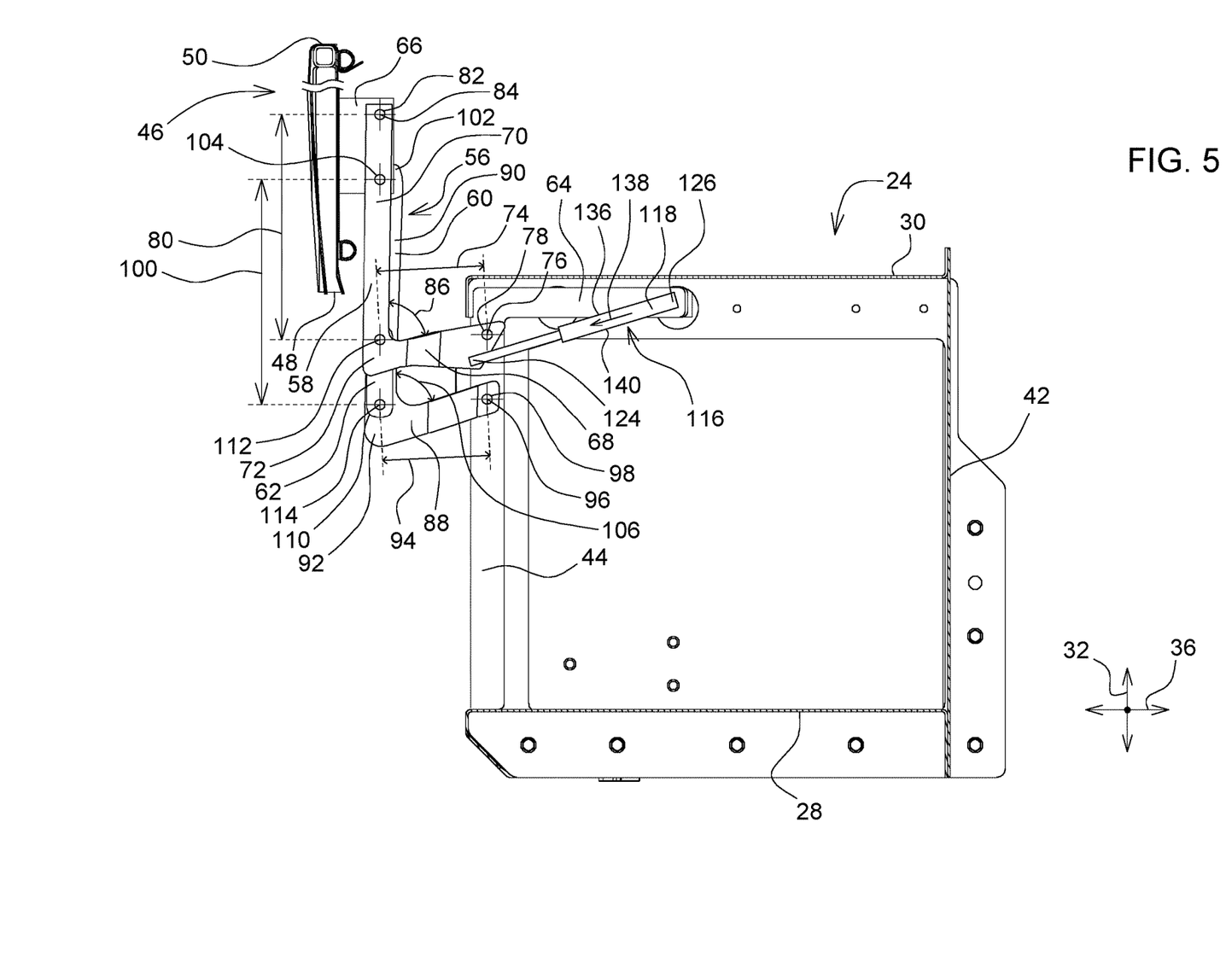
FIG. 5 is a schematic cross sectional side view of the twine storage box showing the door panel in a raised position.
Figure 6:
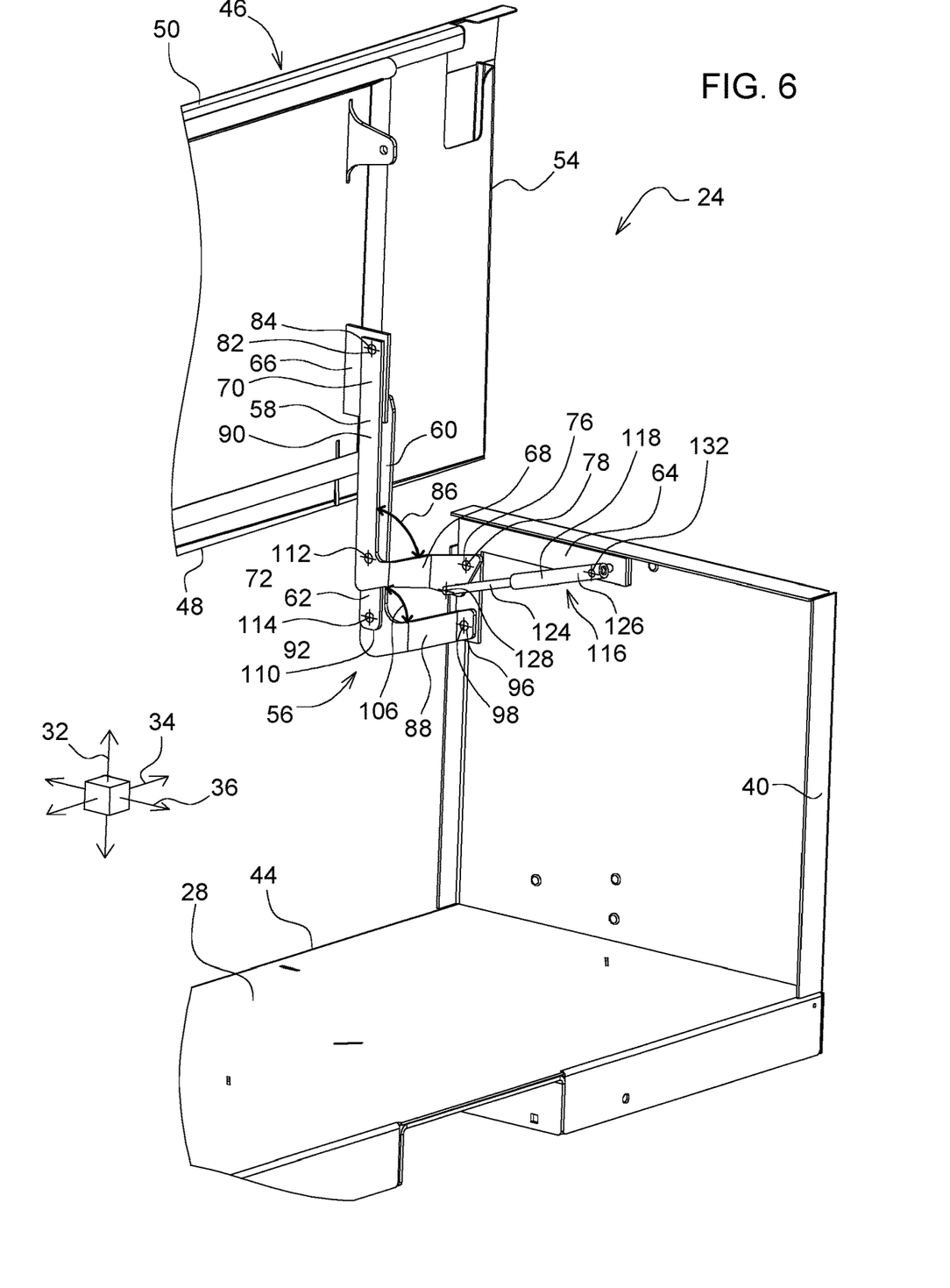
FIG. 6 is a schematic perspective view of the twine storage box showing the door panel in the raised position.

Referring to FIGS. 3-6, the baler implement 20 includes a door panel 46 positioned adjacent the opening 44 of the twine storage box 24. The door panel 46 is positioned in a substantially vertical orientation relative to the housing 22. The door panel 46 is moveably attached to the housing 22 for movement between a lowered position and a raised position. When the door panel 46 is disposed in the lowered position, such as shown in FIGS. 3 and 4, the door panel 46 is operable to enclose the twine storage box 24. When the door panel 46 is disposed in the raised position, such as shown in FIGS. 5 and 6, the door panel 46 is displaced from the opening 44 and configured to provide external access to the twine storage box 24 from the exterior of the baler implement 20.

Referring to FIGS. 1 and 2, the door panel 46 may be sized to fit the opening 44 of the twine box. As such, the door panel 46 may be sized to extend vertically between the lower horizontal wall 28 and the upper horizontal wall 30 along the vertical axis 32, and extend horizontally between the forward end wall 38 and the rearward end wall 40 along the longitudinal axis 34. In other implementations, the baler implement 20 may include multiple door panels 46 positioned to cover the opening 44 of the twine box, with each of the multiple door panels 46 independently moveable relative to the other of the door panels 46.

Referring to FIGS. 3 and 5, the door panel 46 includes a lower edge 48 and an upper edge 50. The upper edge 50 of the door panel 46 is positioned vertically above and is spaced from the lower edge 48 along the vertical axis 32. Referring to FIG. 2, the door panel 46 further includes a forward edge 52 and a rearward edge 54. The forward edge 52 of the door panel 46 is spaced from the rearward edge 54 of the door panel 46 along the horizontal axis.

Referring to FIGS. 3 and 5, when the door panel 46 is disposed in the lowered position the lower edge 48 of the door panel 46 is positioned proximate the lower horizontal wall 28 of the twine storage box 24 and the upper edge 50 of the door panel 46 is positioned proximate the upper horizontal wall 30 of the twine storage box 24. When the door panel 46 is disposed in the raised position, the lower edge 48 of the door panel 46 is positioned proximate the upper horizontal wall of the twine storage box 24.

Referring to FIGS. 3-5, the baler implement 20 includes a linkage system 56 interconnecting the housing 22 and the door panel 46. The linkage system 56 includes a first link 58, a second link 60, and a connection link 62. The first link 58 and the second link 60 interconnect the door panel 46 and the housing 22. The connection link 62 connects the first link 58 and the second link 60. The linkage system 56, including the first link 58, the second link 60, and the connection link 62, are configured to move the door panel 46 relative to the housing 22 in both a transverse direction along the transverse axis 36 and a vertical direction along the vertical axis 32 simultaneously while maintaining the substantially vertical orientation of the door panel 46 relative to the housing 22 when moving between the lowered position and the raised position.

In one implementation, the first link 58 and the second link 60 may each be directly connected to the housing 22 and/or the door panel 46. In other implementations, the first link 58 and the second link 60 may be attached to the housing 22 and/or the door panel 46 via another component. For example, in the example implementation shown in the Figures and described herein, the linkage system 56 includes a housing bracket 64 and a panel bracket 66. The housing bracket 64 interconnects the housing 22 and the first link 58. The housing bracket 64 further interconnects the housing 22 and the second link 60. As such, the housing bracket 64 is attached to the housing 22, with the first link 58 and the second link 60 attached to the housing bracket 64. The panel bracket 66 interconnects the door panel 46 and the first link 58. The panel bracket 66 further interconnects the door panel 46 and the second link 60. As such, the panel bracket 66 is attached to the door panel 46, with the first link 58 and the second link 60 attached to the panel bracket 66.

The first link 58 includes a shape generally described as an L-shape. While the first link 58 is generally described as having the L-shape, it should be appreciated that the L-shape is a general descriptor, and should be interpreted broadly. As such, the features of the first link 58 forming the general L-shape are described in greater detail below.

The first link 58 includes a first leg portion 68 and a second leg portion 70. The first leg portion 68 of the first link 58 and the second leg portion 70 of the first link 58 are joined together at a first link vertex 72. Each of the first leg portion 68 of the first link 58 and the second leg portion 70 of the first link 58 extend away from the first link vertex 72. The first leg portion 68 of the first link 58 extends from the first link vertex 72 a first distance 74 to a first leg attachment location 76. The first link 58 is rotatably coupled to the housing 22 at the first leg attachment location 76. The first link 58 is rotatable relative to the housing 22 about a first axis 78 extending through and defined by the first leg attachment location 76. The second leg portion 70 of the first link 58 extends from the first link vertex 72 a second distance 80 to a second leg attachment location 82. The first link 58 is rotatably coupled to the door panel 46 at the second leg attachment location 82. The first link 58 is rotatable relative to the door panel 46 about a second axis 84 extending through and defined by the second leg attachment location 82. The first axis 78 and the second axis 84 are generally parallel with each other, and are generally parallel with the door panel 46.

The second distance 80, i.e., the second leg portion 70 of the first link 58, is greater than the first distance 74, i.e., the first leg portion 68 of the first link 58. As such, the first leg portion 68 of the first link 58 forms the shorter leg of the L-shape of the first link 58, and the second leg portion 70 of the first link 58 forms the longer leg of the L-shape of the first link 58.

The first leg portion 68 of the first link 58 and the second leg portion 70 of the first link 58 define a first link angle 86 therebetween. In one implementation, the first link angle 86 is substantially equal to ninety degrees. However, it should be appreciated that in other implementations the first link angle 86 may vary from the example implementation of substantially ninety degrees shown in the Figures. For example, the first link angle 86 may vary between sixty degrees and one hundred twenty degrees.

The second link 60 includes a shape generally described as an L-shape. While the second link 60 is generally described as having the L-shape, it should be appreciated that the L-shape is a general descriptor, and should be interpreted broadly. As such, the features of the second link 60 forming the general L-shape are described in greater detail below.

The second link 60 includes a first leg portion 88 and a second leg portion 90. The first leg portion 88 of the second link 60 and the second leg portion 90 of the second link 60 are joined together at a second link vertex 92. Each of the first leg portion 88 of the second link 60 and the second leg portion 90 of the second link 60 extend away from the second link vertex 92. The first leg portion 88 of the second link 60 extends from the second link vertex 92 a third distance 94 to a third leg attachment location 96. The second link 60 is rotatably coupled to the housing 22 at the third leg attachment location 96. The second link 60 is rotatable relative to the housing 22 about a third axis 98 extending through and defined by the third leg attachment location 96. The second leg portion 90 of the second link 60 extends from the second link vertex 92 a fourth distance 100 to a fourth leg attachment location 102. The second link 60 is rotatably coupled to the door panel 46 at the fourth leg attachment location 102. The second link 60 is rotatable relative to the door panel 46 about a fourth axis 104 extending through and defined by the fourth leg attachment location 102. The third axis 98 and the fourth axis 104 are generally parallel with each other, and are generally parallel with the door panel 46 and the longitudinal axis 34. The first axis 78 and the second axis 84 are generally parallel with both the third axis 98 and the fourth axis 104.

The fourth distance 100, i.e., the second leg portion 90 of the second link 60, is greater than the third distance 94, i.e., the first leg portion 88 of the second link 60. As such, the first leg portion 88 of the second link 60 forms the shorter leg of the L-shape of the second link 60, and the second leg portion 90 of the second link 60 forms the longer leg of the L-shape of the second link 60.

The first leg portion 88 of the second link 60 and the second leg portion 90 of the second link 60 define a second link angle 106 therebetween. In one implementation, the second link angle 106 is substantially equal to ninety degrees. However, it should be appreciated that in other implementations the second link angle 106 may vary from the example implementation of substantially ninety degrees shown in the Figures. For example, the second link angle 106 may vary between sixty degrees and one hundred twenty degrees. In one implementation, the first link angle 86 and the second link angle 106 are substantially equal to each other.

As described above, the linkage system 56 includes the connection link 62. The connection link 62 interconnects the first link 58 and the second link 60. The connection link 62 includes an upper end 108 and a lower end 110. The upper end 108 of the connection link 62 is rotatably coupled to the first link 58 proximate the first link vertex 72. The connection link 62 is rotatable relative to the first link 58 about a fifth axis 112 extending through and defined by the first link vertex 72. The lower end 110 of the connection link 62 is rotatably coupled to the second link 60 proximate the second link vertex 92. The connection link 62 is rotatable relative to the second link 60 about a sixth axis 114 extending through and defined by the second link vertex 92. The fifth axis 112 and the sixth axis 114 are generally parallel with each other and with the door panel 46. The fifth axis 112 and the sixth axis 114 are also both generally parallel with the first axis 78, the second axis 84, the third axis 98, and the fourth axis 104.

Figure 7:
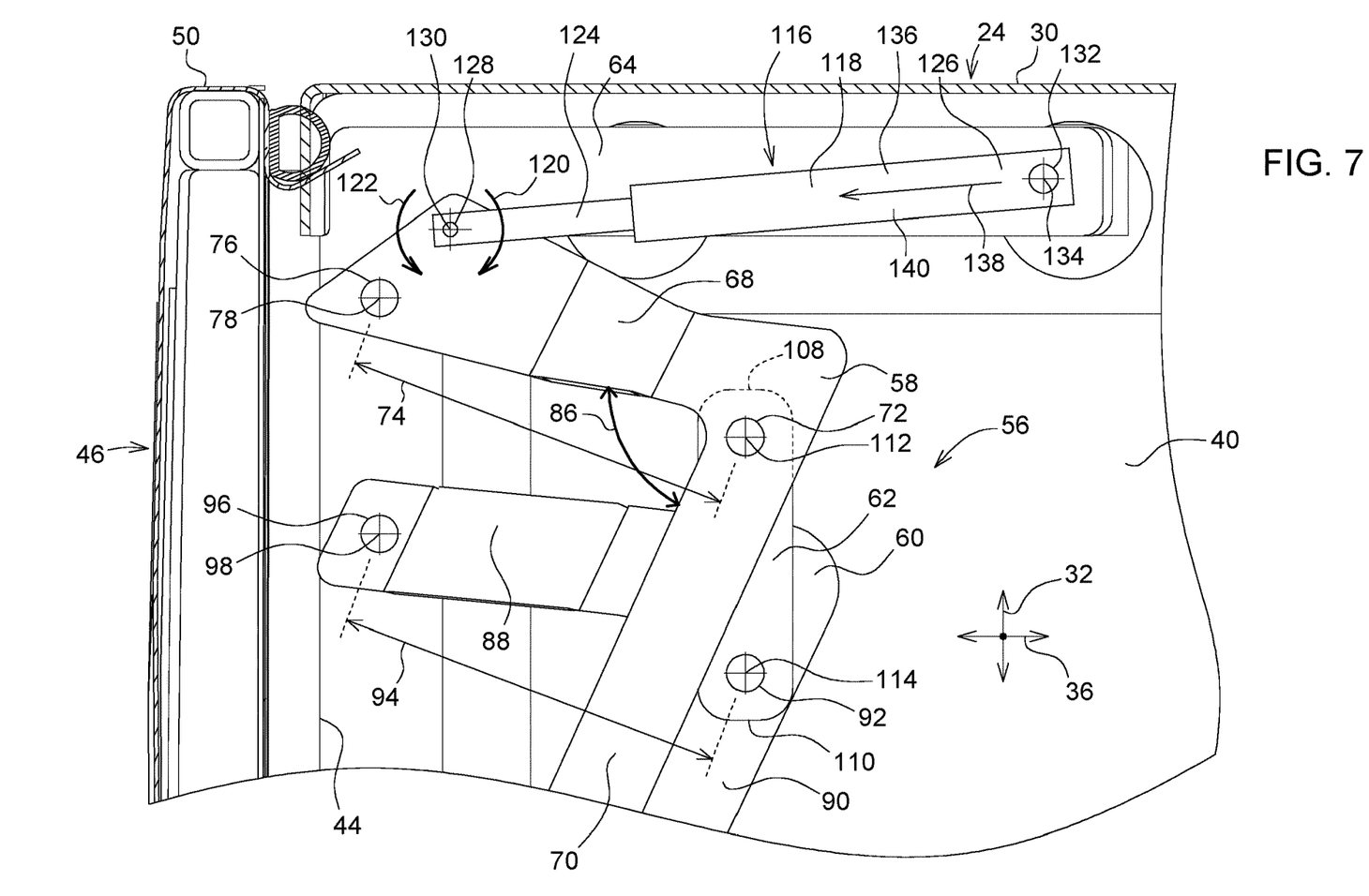
FIG. 7 is a schematic enlarged cross sectional side view of the twine box showing the door panel in the lowered position.
Figure 8:
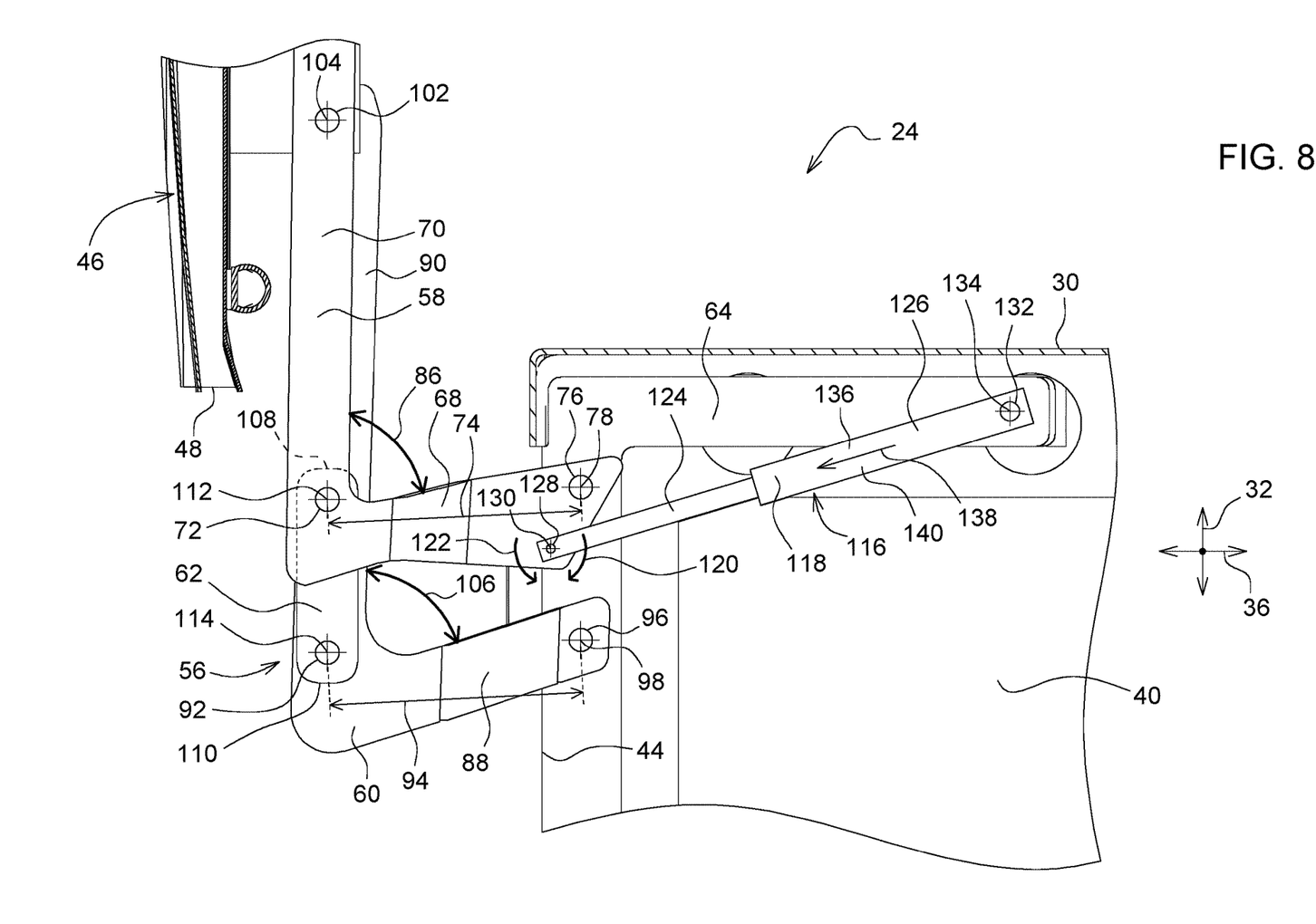
FIG. 8 is a schematic enlarged cross sectional side view of the twine box showing the door panel in the raised position.

Referring go FIGS. 7 and 8, the linkage system 56 may further include a position controller 116. The position controller 116 may be operable to secure the door panel 46 relative to the housing 22 in one or both of the raised position and/or the lowered position. In one implementation, the position controller 116 interconnects the housing 22 and one of the first link 58 and the second link 60. In the example implementation shown in the Figures and described herein, the position controller 116 is rotatably attached to and interconnects the housing 22 and the first link 58. More particularly, in the example implementation described herein, the position controller 116 is attached to the housing bracket 64, which in turn couples the position controller 116 to the housing 22. However, in other implementations, it should be appreciated that the position controller 116 may be directly coupled to the housing 22, and/or coupled to the second link 60.

In the example implementation shown in the Figures and described herein, the position controller 116 is operable to extend and retract. Additionally, the position controller 116 is biased toward extension. For example, the position controller 116 may include a gas spring 118 or other similar device that is configured to extend when not restricted. However, it should be appreciated that the position controller 116 may be configured and operate differently than the example implementation described herein. For example, the position controller 116 may include a mechanical locking and/or latching system, an electronic locking and/or latching system, a hydraulic system such as a hydraulic cylinder, lever springs, bar springs, coil springs, etc.

The position controller 116 may be coupled to the one of the first link 58 and the second link 60 in a position that allows the position controller 116 to move over-center relative to an axis of rotation of the one of the first link 58 and the second link 60 during movement of the door panel 46 between the raised position and the lowered position. By moving over-center during movement between the raised position and the lowered position, the position controller 116 may bias the one of the first link 58 and the second link 60 about the axis of rotation in a first rotational direction 120 when the door panel 46 is disposed in the raised position, and may bias the one of the first link 58 and the second link 60 about the axis of rotation in a second rotational direction 122 when the door panel 46 is disposed in the lowered position. The first rotational direction 120 and the second rotational direction 122 are opposite each other.

For example, in the implementation shown in the Figures and described herein, the position controller 116 includes a first end 124 and a second end 126. The first end 124 of the position controller 116 is rotatably attached to the first link 58 at a first controller connection location 128. The first controller connection location 128 is spaced from the first leg attachment location 76. The position controller 116 is rotatable relative to the first link 58 about a first connection axis 130 that is defined by the first controller connection location 128. The first controller connection location 128 rotates with the first link 58 about the first axis 78 of the first leg attachment location 76. The second end 126 of the position controller 116 is rotatably attached to the housing bracket 64 (and thereby the housing 22) at a second controller connection location 132. The position controller 116 is rotatable relative to the housing 22 about a second connection axis 134 defined by the second controller connection location 132.

When the first end 124 of the position controller 116 is positioned on a first side 136 of a vector 138 extending between the first leg attachment location 76 and the second controller connection location 132, the position controller 116 biases toward extension to bias the first link 58 in the first rotational direction 120 to move the door panel 46 towards and into the raised position. When the first end 124 of the position controller 116 is positioned on a second side 140 of the vector 138 extending between the first leg attachment location 76 and the second controller connection location 132, the position controller 116 biases toward extension to bias the first link 58 in the second rotational direction 122 to move the door panel 46 towards and into the lowered position. The position controller 116 moves over-center when passing over the vector 138, i.e., when moving from one of the first side 136 and the second side 140 of the vector 138 to the other of the first side 136 and the second side 140 of the vector 138. The tendency of the position controller 116 to bias toward extension may be overcome by an operator manually moving the door panel 46, thereby forcing the position controller 116 to retract, until the position controller 116 moves over-center, whereupon the natural tendency of the position control to bias toward extension will then assist in movement of the door panel 46.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
    a housing defining a twine storage box;
    a door panel positioned in a substantially vertical orientation relative to the housing and moveably attached to the housing for movement between a lowered position for enclosing the twine storage box and a raised position providing external access to the twine storage box; and
    a linkage system having a first link and a second link each interconnecting the door panel and the housing, wherein the first link and the second link maintain the door panel in the substantially vertical orientation relative to the housing while moving between the lowered position and the raised position.

2. The baler implement set forth in claim 1, wherein the twine storage box includes a lower horizontal wall and an upper horizontal wall, with the upper horizontal wall positioned vertically above and spaced from the lower horizontal wall, and wherein the door panel includes a lower edge and an upper edge, with the upper edge positioned vertically above and spaced from the lower edge.

3. The baler implement set forth in claim 2, wherein the lower edge of door panel is positioned proximate the lower horizontal wall of the twine storage box when the door panel is disposed in the lowered position, and wherein the lower edge of the door panel is positioned proximate the upper horizonal wall of the twine storage box when the door panel is disposed in the raised position.

4. The baler implement set forth in claim 1, wherein the first link and the second link are configured to move the door panel relative to the housing in both a transverse direction and a vertical direction simultaneously while maintaining the substantially vertical orientation of the door panel relative to the housing.

5. The baler implement set forth in claim 1, wherein the linkage system includes a position controller interconnecting the housing and one of the first link and the second link, wherein the position controller is operable to secure the door panel relative to the housing in both the raised position and the lowered position.

6. The baler implement set forth in claim 5, wherein the position controller is operable to extend and retract and is biased toward extension.

7. The baler implement set forth in claim 6, wherein the position controller includes a gas spring.

8. The baler implement set forth in claim 6, wherein the position controller is coupled to the one of the first link and the second link in a position to move over-center relative to an axis of rotation of the one of the first link and the second link during movement of the door panel between the raised position and the lowered position, such that the position controller biases the one of the first link and the second link about the axis of rotation in a first rotational direction when the door panel is disposed in the raised position, and wherein the position controller biases the one of the first link and the second link about the axis of rotation in a second rotational direction when the door panel is disposed in the lowered position.

9. The baler implement set forth in claim 1, wherein the linkage system includes a connection link interconnecting the first link and the second link.

10. The baler implement set forth in claim 1, wherein the first link includes an L-shape having a first leg portion and a second leg portion each extending away from a first link vertex.

11. The baler implement set forth in claim 10, wherein the first leg portion of the first link extends from the first link vertex a first distance to a first leg attachment location, with the first link rotatably coupled to the housing at the first leg attachment location.

12. The baler implement set forth in claim 11, wherein the second leg portion of the first link extends from the first link vertex a second distance to a second leg attachment location, with the first link rotatably coupled to the door panel at the second leg attachment location.

13. The baler implement set forth in claim 12, wherein the second distance is greater than the first distance.

14. The baler implement set forth in claim 10, wherein the first leg portion of the first link and the second leg portion of the first link define a first link angle therebetween, with the first link angle substantially equal to ninety degrees.

15. The baler implement set forth in claim 10, wherein the second link includes an L-shape having a first leg portion and a second leg portion each extending away from a second link vertex.

16. The baler implement set forth in claim 15, wherein the first leg portion of the second link extends from the second link vertex a third distance to a third leg attachment location, with the second link rotatably coupled to the housing at the third leg attachment location.

17. The baler implement set forth in claim 16, wherein the second leg portion of the second link extends from the second link vertex a fourth distance to a fourth leg attachment location, with the second link rotatably coupled to the door panel at the fourth leg attachment location.

18. The baler implement set forth in claim 17, wherein the fourth distance is greater than the third distance.

19. The baler implement set forth in claim 15, wherein the first leg portion of the second link and the second leg portion of the second link define a second link angle therebetween, with the second link angle substantially equal to ninety degrees.

20. The baler implement set forth in claim 15, wherein the linkage system includes a connection link having an upper end rotatably coupled to the first link proximate the first link vertex, and a lower end rotatably coupled to the second link proximate the second link vertex.

21. The baler implement set forth in claim 1, further comprising a housing bracket interconnecting the housing and the first link and interconnecting the housing and the second link.

22. The baler implement set forth in claim 1, further comprising a panel bracket interconnecting the door panel and the first link and interconnecting the door panel and the second link.

23. A linkage system for attaching a door panel to a housing of a baler implement, the linkage system comprising:
- a first link including an L-shape having a first leg portion configured for rotatable attachment to the housing, and a second leg portion configured for rotatable attachment to the door panel, the first leg portion and the second leg portion of the first link joining together at a first link vertex;
- a second link including an L-shape having a first leg portion configured for rotatable attachment to the housing, and a second leg portion configured for rotatable attachment to the door panel, the first leg portion and the second leg portion of the second link joining together at a second link vertex; and
- a connection link having an upper end rotatably coupled to the first link proximate the first link vertex, and a lower end rotatably coupled to the second link proximate the second link vertex;
- wherein the first link and the second link are operable to maintain the door panel in a substantially vertical orientation relative to the housing while moving between a lowered position and a raised position.

24. The linkage system set forth in claim 23, further comprising a position controller coupled to one of the first link and the second link, wherein the position controller is operable to extend and retract, and wherein the position controller is biased toward extension.

25. The linkage system set forth in claim 24, wherein the position controller includes a gas spring.

26. The linkage system set forth in claim 24, wherein the position controller is coupled to the one of the first link and the second link in a position to move over-center relative to an axis of rotation of the one of the first link and the second link during movement between the raised position and the lowered position, such that the position controller biases the one of the first link and the second link about the axis of rotation in a first rotational direction when the one of the first link and the second link is disposed in the raised position, and wherein the position controller biases the one of the first link and the second link about the axis of rotation in a second rotational direction when the one of the first link and the second link is disposed in the lowered position.

27. The linkage system set forth in claim 23, wherein:
the first leg portion of the first link extends from the first link vertex a first distance to a first leg attachment location, with the first link configured for rotatable attachment to the housing at the first leg attachment location;
the second leg portion of the first link extends from the first link vertex a second distance to a second leg attachment location, with the first link configured for rotatable attachment to the door panel at the second leg attachment location; and
the second distance is greater than the first distance.

28. The linkage system set forth in claim 27, wherein:
the first leg portion of the second link extends from the second link vertex a third distance to a third leg attachment location, with the second link configured for rotatable attachment to the housing at the third leg attachment location;
the second leg portion of the second link extends from the second link vertex a fourth distance to a fourth leg attachment location, with the second link configured for rotatable attachment to the door panel at the fourth leg attachment location; and
the fourth distance is greater than the third distance.

\* \* \* \* \*